（12）United States Patent
Hidaka

(10) Patent No.: US 7,113,355 B2
(45) Date of Patent: Sep. 26, 2006

(54) SYSTEM AND METHOD FOR DETECTING HEAD INSTABILITY

(75) Inventor: Fumitoshi Hidaka, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 105 days.

(21) Appl. No.: 11/004,157

(22) Filed: Dec. 3, 2004

(65) Prior Publication Data

US 2006/0119963 A1    Jun. 8, 2006

(51) Int. Cl.
*G11B 27/36* (2006.01)
*G11B 5/02* (2006.01)
*G11B 5/09* (2006.01)

(52) U.S. Cl. ............... 360/31; 360/25; 360/46
(58) Field of Classification Search ............. 360/31, 360/25, 46
See application file for complete search history.

(56) References Cited

U.S. PATENT DOCUMENTS

| 6,373,647 B1 * | 4/2002 | Baker ................. 360/25 |
| 6,433,540 B1 * | 8/2002 | Hachisuka et al. ....... 324/210 |
| 6,943,545 B1 * | 9/2005 | Patland et al. .......... 324/210 |

* cited by examiner

*Primary Examiner*—Wayne Young
*Assistant Examiner*—Jason Olson
(74) *Attorney, Agent, or Firm*—Fliesler Meyer LLP

(57) ABSTRACT

Embodiments of the present invention relate to systems, methods, and computer readable media for calibrating storage devices such as hard drives. A testing system is connected to a group of storage devices that are being prepared for release and eventual sale. Alternately, a storage device may be connected to an end-user system for which it is in use. The storage devices are tested for head instability. A lower frequency test pattern is performed, which induces a stronger magnetic field. A measurement of servo gain control is taken while reading from a disk and compared to a baseline for servo gain control. If the variance is larger than a predetermined amount, then the read/write head is determined to be unstable.

22 Claims, 7 Drawing Sheets

204

SYSTEM AND METHOD FOR DETECTING HEAD INSTABILITY

FIELD OF THE INVENTION

The present invention relates generally to calibrating storage devices. The present invention relates more specifically to detecting unstable read/write heads.

BACKGROUND OF THE INVENTION

Over the past ten years, the mass production of storage devices has become both increasingly large in scale and increasingly competitive. The combination of aggressive computer upgrade schedules, increased storage demands driven by media applications, and the opening of foreign markets to computer sales has driven up the size and scale of storage device production. However, at the same time, increased competition has driven down the cost of computer components such as storage devices. This combination of increased scale and cost-reduction pressures has increased the importance of production efficiency.

Among the tests performed during the testing of a storage device, is a head instability test. This test is intended to detect read/write heads that are prone to shifts in their magnetic fields, which can produce errors when reading the from the hard drive. Current methods of testing instability, utilize a series of high frequency shifts in the bias current (reversing the current direction every 1 or 2 cycles) that fail to fully effect the deeper layers of the read/write heads, thus allowing unstable heads to evade detection. What is needed is an improved system and method for testing that successfully excites deeper layers of the read/write head, thus allowing unstable heads to be detected.

DETAILED DESCRIPTION

Embodiments of the present invention relate to systems, methods, and computer readable media for calibrating storage devices such as hard drives. A testing system is connected to a group of storage devices that are being prepared for release and eventual sale. Alternately, a storage device may be connected to an end-user system for which it is in use. The storage devices are tested for head instability. A lower frequency test pattern is performed, which induces a stronger magnetic field. A measurement of servo gain control is taken while reading from a disk and compared to a baseline for servo gain control. If the variance is larger than a predetermined amount, then the read/write head is determined to be unstable.

Figure 1:
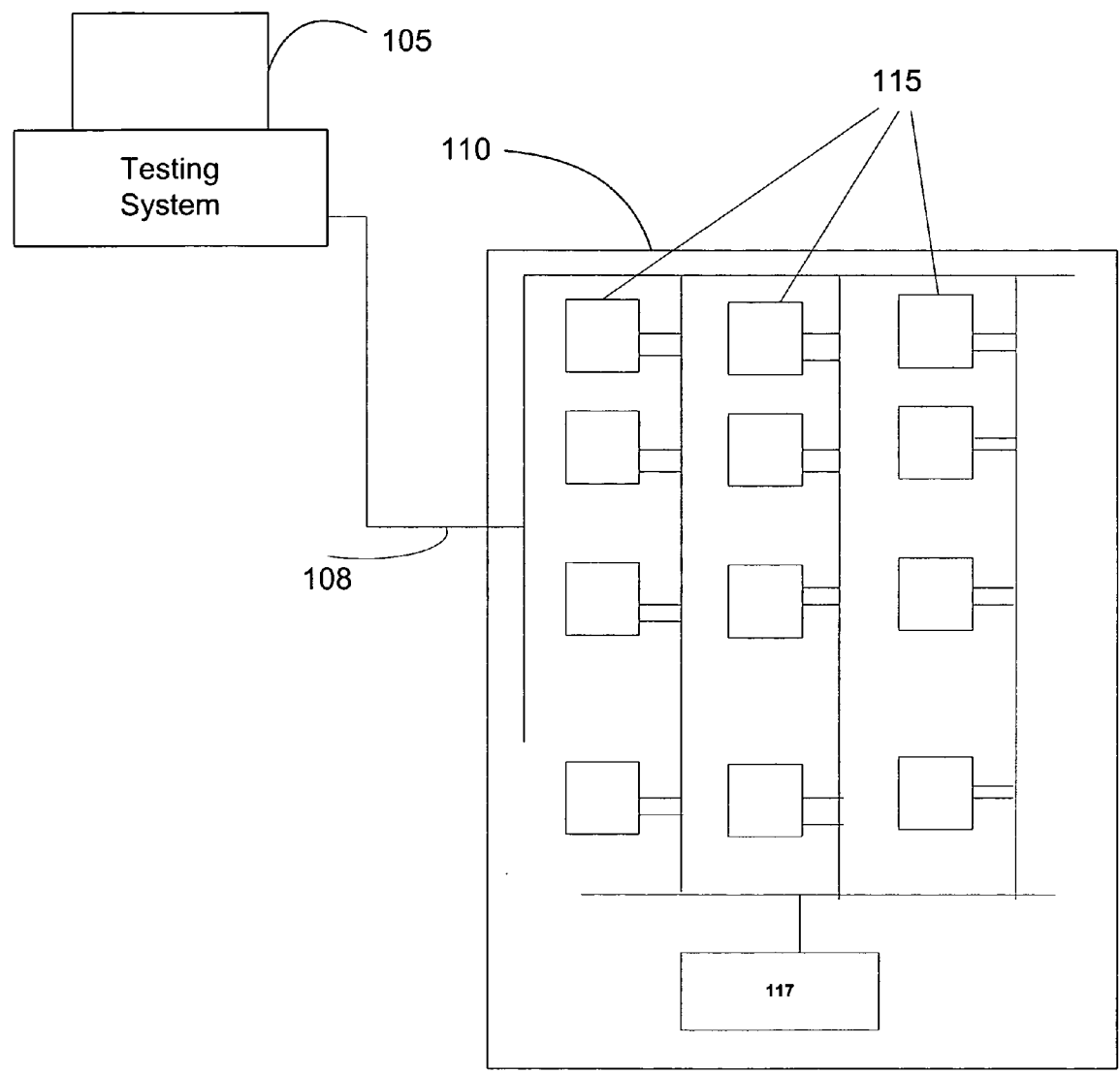
FIG. 1 is a block diagram illustrating a testing apparatus.

FIG. 1 is a block diagram illustrating an overview of an exemplary system for testing hard drives. The system includes a testing system 105. The testing system 105 may be a conventional computer or a computer configured specially for the purposes of storage device testing. The testing system 105 is configured to transmit testing instructions to an array 110 of hard drives 115 through an interface 108 and to receive feedback from the tested hard drives 115. The hard drives are powered through a power supply 117 connected to the array. Each hard drive has at least two connections, one for data transfer and one for power.

The hard drive array 110 includes multiple hard drives 115 that are connected to the array through one or more serial ports 108, Integrated Drive Electronics (IDE) ports, an infrared wireless connection (e.g IRDA) or some manner of proprietary connection. In the present embodiment, the hard drives 115 are new drives that have been designated for post-production assembly testing. In an alternate embodiment, the hard drives are drives that have been returned for additional diagnostics. The hard drives 115 perform a series of diagnostic tests that are received from the testing system 105 or stored internally in the hard drives 115. The test system 105 gathers output from the hard drives 115 through the serial ports 108.

In some embodiments, the testing system 105 is not connected to an array, but is a user system (e.g. computer in public or private use) which is performing diagnostics on its own internal storage device or a single external hard drive. In those embodiments, the interface 108 can be a standard host to storage interface such as an Integrated Drive electronics (IDE). The diagnostics can include tests to predict potential failures of the storage devices 115.

In additional embodiments, the hard drives are connected to the array 110 initially and instructions are downloaded from the test system 105 to the hard drives 115 through the serial ports 108. The test system 105 is then disconnected and the hard drives 115 run the tests, which in one embodiment take 20–30 hours. A system such as the test system 105 can then be reconnected to the array 110, which receives the test results from the hard drives 115. The test results are used to sort the hard drives, with the better performing drives being passed forward to the next manufacturing stage and the weaker performing drives being returned for further testing or rework.

Figure 2:
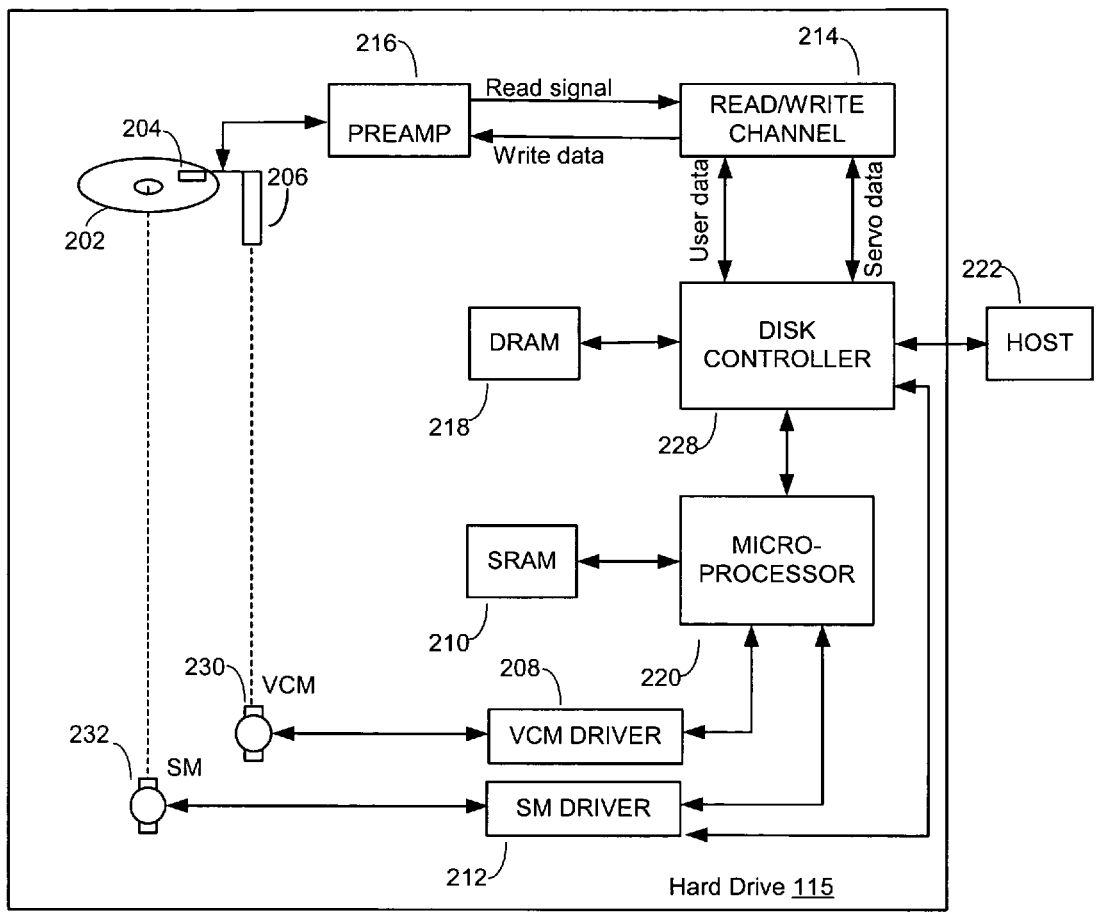
FIG. 2 is a block diagram illustrating a more detailed view of a hard drive.

FIG. 2 shows a more detailed view of a storage device 115, which includes at least one rotatable storage medium 202 (i.e., disk) capable of storing information on at least one of its surfaces. In a magnetic disk drive as described below, the storage medium 202 is a magnetic disk. The numbers of disks and surfaces may vary from disk drive to disk drive. A closed loop servo system, including an actuator assembly 206, can be used to position a head 204 over selected tracks of the disk 202 for reading or writing, or to move the head 204 to a selected track during a seek operation. In one embodiment, the head 204 is a magnetic transducer adapted to read data from and write data to the disk 202. In another embodiment, the head 204 includes separate read and write elements. For example, the separate read element can be a magnetoresistive head, also known as an MR head. It will be understood that various head configurations may be used with embodiments of the present invention, including the characteristic that the read positions and write positions of the head differ and must be calibrated.

A servo system can include a voice coil motor driver 208 to drive a voice coil motor (VCM) 230 for rotation of the actuator assembly 206, a spindle motor driver 212 to drive a spindle motor 232 for rotation of the disk 202, a microprocessor 220 to control the VCM driver 208 and the spindle motor driver 212, and a disk controller 228 to accept information from a host 222 and to control many disk functions. The host 222 can be any device, apparatus, or system capable of utilizing the storage device 115, such as a personal computer, cellular phone, or Web server. In one embodiment, the host 222 is the test system 105. The disk controller 228 can include an interface controller in some embodiments for communicating with the host 222, and in other embodiments a separate interface controller can be used. Servo fields on the disk 202 are used for servo control to keep the head 204 on track and to assist with identifying proper locations on the disk 202 where data is written to or read from. When reading servo fields, the head 204 acts as a sensor that detects position information to provide feedback for proper positioning of the head 204 and for determination of the rotational position of the disk 202 via wedge numbers or other position identifiers.

The microprocessor 220 can also include a servo system controller, which can exist as circuitry within the drive or as an algorithm resident in the microprocessor 220, or as a combination thereof. In other embodiments, an independent servo controller can be used. Additionally, the microprocessor 220 may include some amount of memory such as SRAM, or an external memory such as SRAM 210 can be coupled with the microprocessor 220. The disk controller 228 can also provide user data to a read/write channel 214, which can send signals to a preamp 216 to be written to the disk 202, and can send servo signals to the microprocessor 220. The disk controller 228 can also include a memory controller to interface with memory 218. Memory 218 can be DRAM, which in some embodiments, can be used as a buffer memory. In alternate embodiments, it is possible for the buffer memory to be implemented in the SRAM 210.

Although shown as separate components, the VCM driver 208 and spindle motor driver 212 can be combined into a single "power controller." It is also possible to include the spindle control circuitry in that chip. The microprocessor 220 is shown as a single unit directly communicating with the VCM driver 208, although a separate VCM controller processor (not shown) may be used in conjunction with processor 220 to control the VCM driver 208. Further, the processor 220 can directly control the spindle motor driver 212, as shown. Alternatively, a separate spindle motor controller processor (not shown) can be used in conjunction with microprocessor 220.

Figure 3:
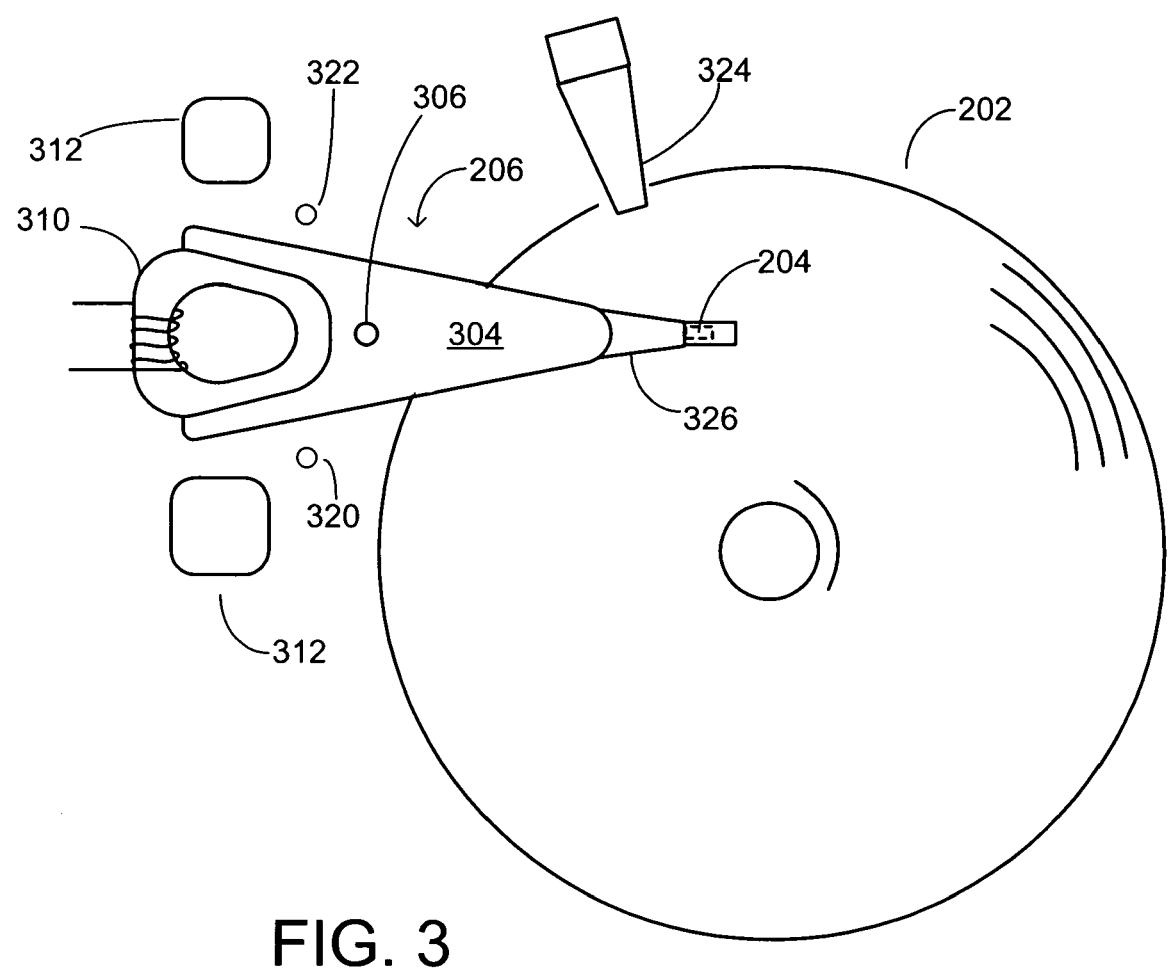
FIG. 3 is a diagram illustrating a more detailed view of an actuator assembly.

FIG. 3 shows some additional details of the actuator assembly 206. The actuator assembly 206 includes an actuator arm 304 that is positioned proximate the disk 202, and pivots about a pivot point 306 (e.g., which may be an actuator shaft). Attached to the actuator arm 304 is the read/write head 204, which can include one or more transducers for reading data from and writing data to a magnetic medium, an optical head for exchanging data with an optical medium, or another suitable read/write device. Also, attached to the actuator arm 304 is an actuator coil 310, which is also known as a voice coil or a voice actuator coil.

The voice coil 310 moves relative to one or more magnets 312 (only partially shown) when current flows through the voice coil 310. The magnets 312 and the actuator coil 310 are parts of the voice coil motor (VCM) 230, which applies a force to the actuator arm 304 to rotate it about the pivot point 306. The actuator arm 304 includes a flexible suspension member 326 (also known simply as a suspension). At the end of the suspension 326 is a mounted slider (not specifically shown) with the read/write head 204.

The VCM driver 208, under the control of the microprocessor 220 (or a dedicated VCM controller, not shown) guides the actuator arm 304 to position the read/write head 204 over a desired track, and moves the actuator arm 304 up and down a load/unload ramp 324. A latch (not shown) will typically hold the actuator arm 304 when in the parked position. The drive 115 also includes crash stops 320 and 322. Additional components, such as a disk drive housing, bearings, etc. which have not been shown for ease of illustration, can be provided by commercially available components, or components whose construction would be apparent to one of ordinary skill in the art reading this disclosure.

The actuator assembly sweeps an arc between the inner and outer diameters of the disk 202, that combined with the rotation of the disk 202 allows a read/write head 204 to access approximately an entire surface of the disk 202. The head 204 reads and/or writes data to the disks 202, and thus, can be said to be in communication with a disk 202 when reading or writing to the disk 202. Each side of each disk 202 can have an associated head 204, and the heads 204 are collectively arranged within the actuator assembly such that the heads 204 pivot in unison. In alternate embodiments, the heads can pivot independently. The spinning of the disk 202 creates air pressure beneath the slider to form a micro-gap of typically less than one micro-inch between the disk 202 and the head 204.

Figure 4:
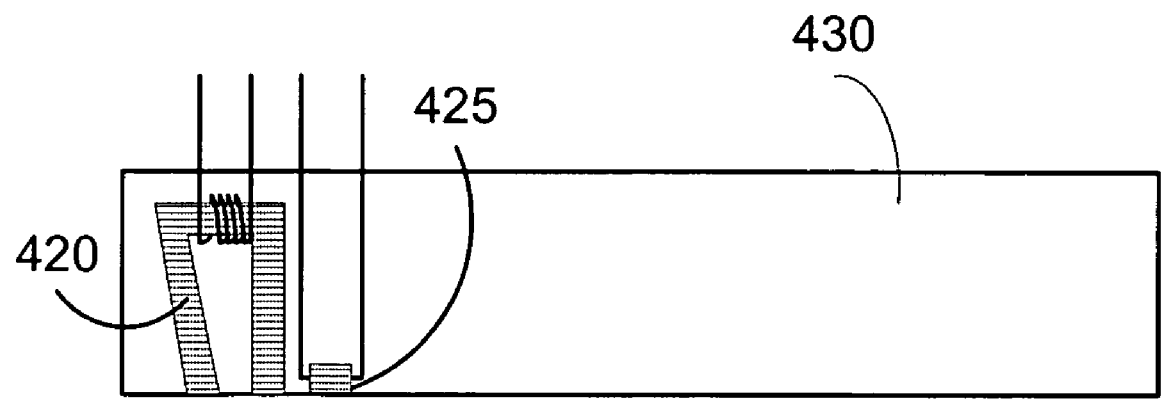
FIG. 4 is a block diagram illustrating a more detailed view of a read/write head.

FIG. 4 is a block diagram illustrating a more detailed view of a read/write head 204. The read/write head 204 includes a write element 420 and a read element 425. The write element 420 can be, for example, an inductor coil deposited on a silicon substrate slider 430 that is used to write data on the disk 202 in the form of magnetic transitions. The read element 425 can be, for example, a magneto-resistive (MR) element that is used to detect the data transitions written on the disk 202 by the write element 420.

Although the write element 420 and read element 425 are typically deposited on the same slider in close proximity, they are still separated by a small distance on the read/write head 204. Thus, when reading a location, the hard drive must move the read/write head 204 to a slightly different position on the disk 202 as compared to when writing data from the same location.

Figure 5:
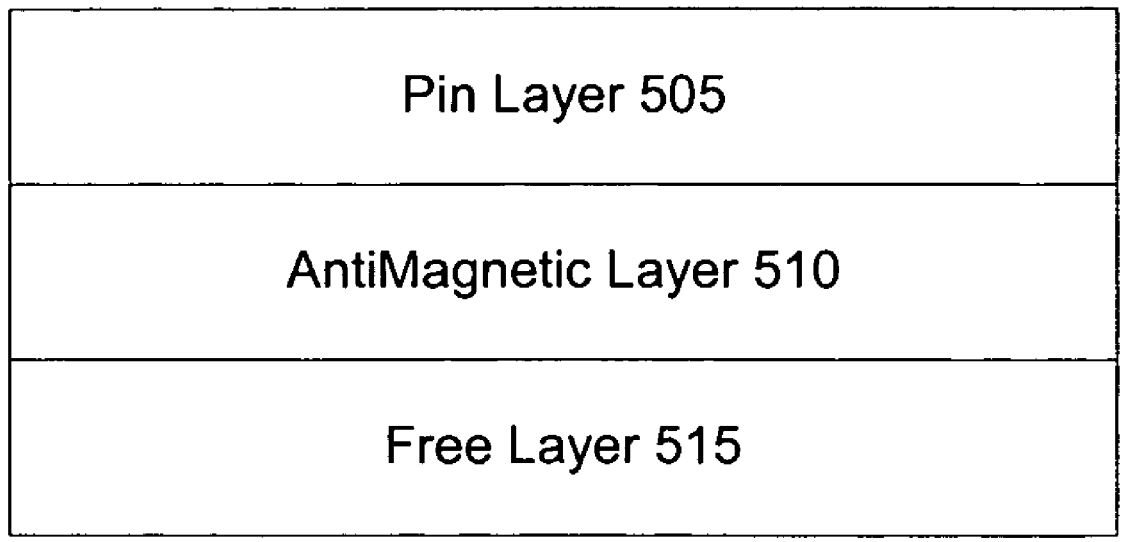
FIG. 5 is a more detailed view of an MagnetoResistive (MR) element.

FIG. 5 is a more detailed view of an MagnetoResistive (MR) 500 head in accordance with one embodiment of the present invention. In some embodiments, this is the read element 425 of FIG. 4. The MR head 500 includes a pin layer 505, an Anti-Magnetic Layer, and a free layer 515. The free layer 515 acts as a sensor that responds to the magnetic fields detected on the surface of the disk 202. The antimagnetic layer provides physical separation between the pin layer 505 and the free layer 515. The pin layer is 505 is held in a fixed magnetic orientation.

The free layer 515 includes electrons that are not aligned in any particular direction. When the MR head passes over a magnetic field, such as the magnetic fields produced by stored data, the spin values of the electrons in the free layer shift so that they are aligned magnetically with the pin layer 505. This realignment makes the MR head 500 a more effective conductor thus causing a reduction in its electrical resistance, which is detectable by the hard drive, thus allowing for the hard drive to detect written information.

However, in the case of unstable heads, magnetic fields from the disk surface can cause orientation of the free layer to flip, thus causing the hard drive to incorrectly detect data on the surface of the disk 202.

Figure 6:
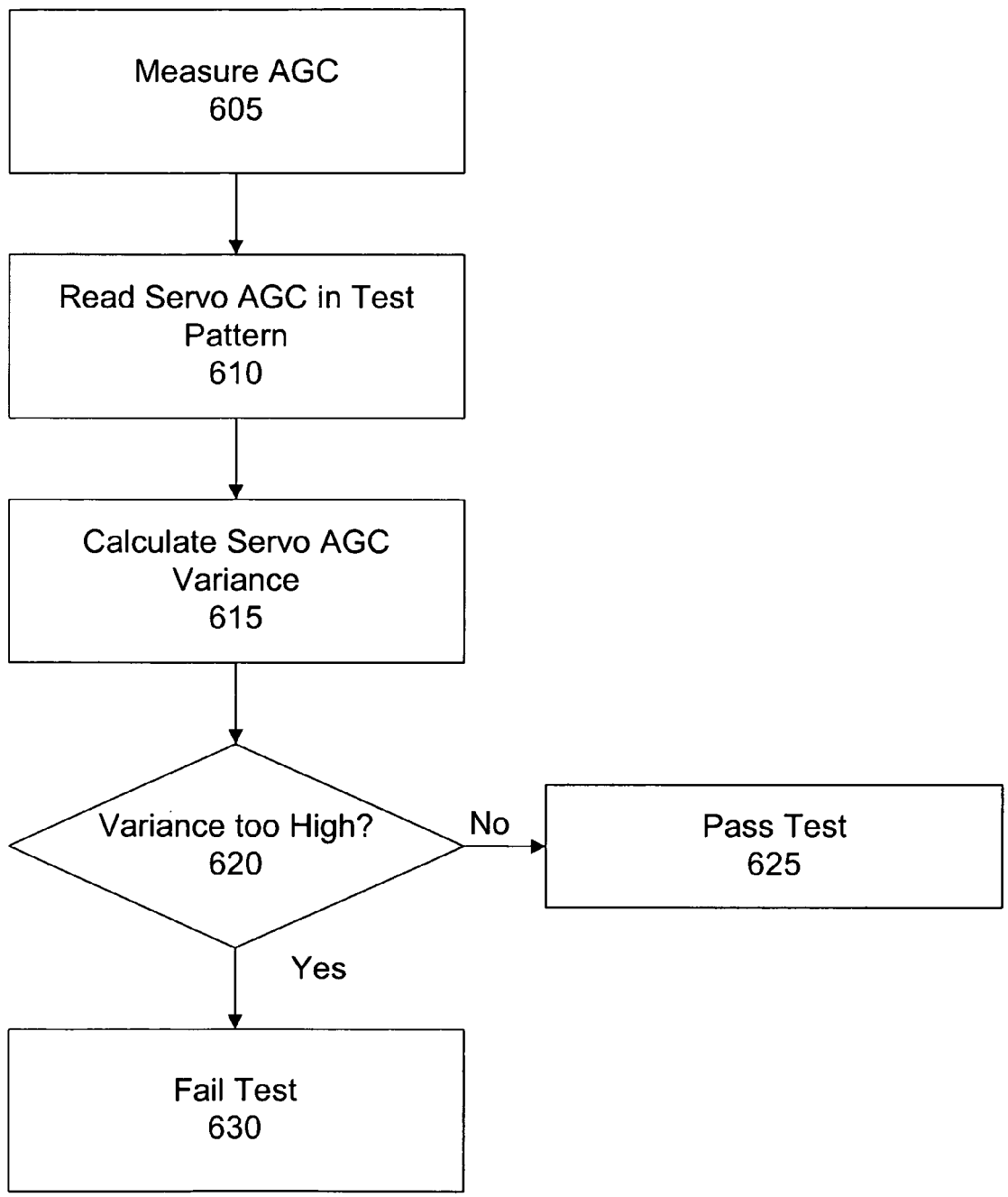
FIG. 6 is a flow chart illustrating a method for detecting unstable read/write heads.

FIG. 6 is a flow chart illustrating a method for detecting unstable read/write heads. The process begins in step 605 when an adjusted gain control is measured when the drive is not reading or writing. The servo, when moving the actuator arm around the disk 202, must apply a current, which induces a magnetic field, which moves the actuator so that the read/write head 204 can be moved to different locations on the disk. Depending on the angle and position of the actuator arm, different levels of force/current may be necessary to move it across the disk. Thus, an adjusted gain control is measured for different locations and angles, so that the actuator arm can be moved accordingly.

In step 610, a test pattern is performed in which the hard drive performs read operations on the disk while measuring the adjusted gain control. The test pattern includes a series of read actions in which, due to the motion of the read/write head an external magnetic field from the disk is oriented in one direction for a fixed period of time and then reversed. This period of time is larger than with conventional methods, or alternately has a lower frequency of external magnetic field change from the disk than conventional methods. In one embodiment, the fixed period of time comprises 16T, where T=one test cycle. In one embodiment, the signal comprises a sinusoidal wave having a length of 16T between 0 values. The longer test pattern length (in the prior art, the field is shifted more frequently) produces a stronger magnetic field which is more likely to excite a deeper area of the MR head 500, which is more likely to cause instabilities to manifest. In alternate embodiments, the fixed period of time can comprise 8T or 4T. The low frequencies disclosed enable the magnetic field to more fully excite the free layer, thus causing the magnetization of any potential unstable heads to flip.

In step 615 the hard drive calculates a variance of adjusted gain control and then compares it to a threshold in step 620. The reasoning behind this step is that if the magnetic polarity reverses in the MR head 500, this will create a different magnetic drag than would be present in the case of an unreversed polarity, thus causing the gain necessary to move the actuator to change.

In step 620 the system determines whether the variance between the adjusted gain control measured in step 615 and the variance measured in step 605 is too high. In one embodiment, a maximum acceptable variance is transmitted with the testing instructions discussed with respect to FIG. 1. In some embodiments, rather than using an overall variance to determine whether the head is unstable, the system checks the adjusted gain at particular locations.

If the adjusted gain control variance is not too high, in step 625 the system determines that the read/write head has passed the test. If the adjusted gain control variance is too high, the system determines that the read/write head has failed the test. In some embodiments, this results in the read/write head being designated for repair.

Figure 7:
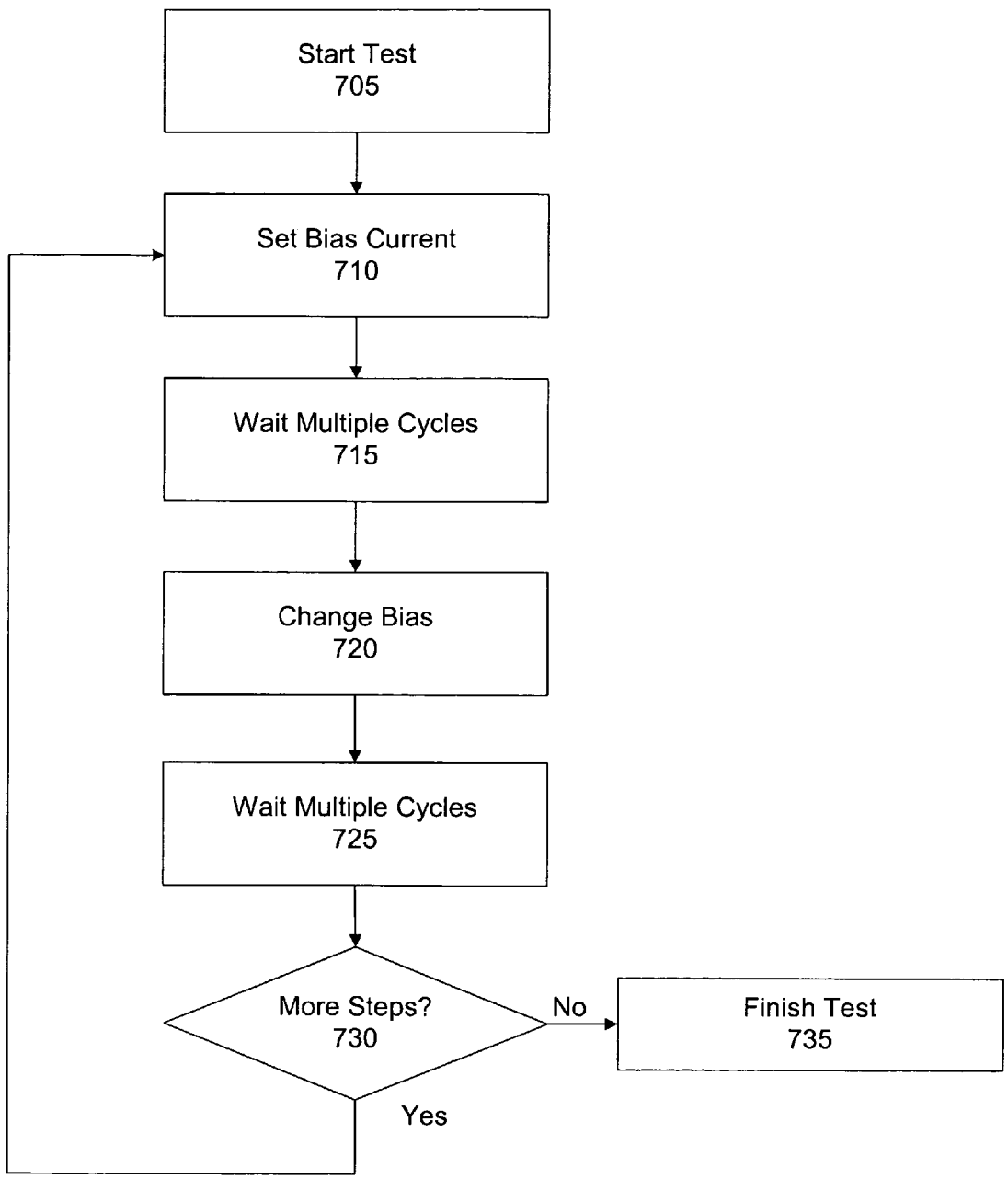
FIG. 7 is a flow chart illustrating a test pattern for detecting unstable read/write heads.

FIG. 7 is a flow chart illustrating a test pattern for detecting unstable read/write heads. In step 705 the hard drive begins writing the test pattern, which entails generating magnetic fields within the MR head that will cause unstable heads to flip their magnetization. In step 710 the hard drive begins measuring a servo adjusted gain control with a first bias current to the read/write head. In step 715 the bias current is continued for an extended period of time allowing for a stronger magnetic field to develop with a 16 T pattern, where T=1 cycle. In alternate embodiments, a 4T, 8T, or 12T pattern can be used. In step 720, the bias current is changed. In some embodiments, during step 715 and 720 the bias current magnitude comprises a sinusoidal wave, with the wave passing through a zero point at the beginning of step 720. In step 720, the changed bias current is set with the test pattern. In step 725, the system determines if additional read cycles remain. If additional cycles remain, the process returns to step 700. If no more patterns remain, the process ends in step 730.

Other features, aspects and objects of the invention can be obtained from a review of the figures and claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention.

The invention claimed is:

1. A method for detecting a read/write head that is prone to instability, the method comprising:

determining gain control values when not reading from a rotatable storage medium;

performing read operations on the rotatable storage medium; and varying a magnetic field in a test pattern while performing the read operations, wherein the magnetic field is varied at a low frequency, the low frequency configured to cause excitation of a free layer of the read/write head.

2. The method of claim 1, wherein the low frequency is less than 1/(16T) wherein T is a cycle of a data clock.

3. The method of claim 1, further comprising:
determining gain control values while performing the read operations on the rotatable storage medium.

4. The method of claim 3, further comprising:
determining a variance in the gain control values while performing the read operations on the rotatable storage medium.

5. The method of claim 4, further comprising:
determining that a read/write head is unstable when the variance is larger than a predetermined amount.

6. The method of claim 5, wherein the variance is a result of the test pattern.

7. The method of claim 1, wherein the frequency is less than 1/(4T) wherein T is a data clock cycle.

8. The method of claim 1, wherein the frequency is less than 1/(8T) wherein T is a data clock cycle.

9. A machine readable medium having instructions stored thereon that when executed by a processor causes a system to:
determine gain control values when not reading from a rotatable storage medium;
perform read operations on the rotatable storage medium; and
vary a magnetic field in a test pattern while performing the read operations, wherein the magnetic field is varied at a low frequency, the low frequency configured to cause excitation of a free layer of the read/write head.

10. The machine readable medium of claim 9, wherein the low frequency is less than 1/(16T) wherein T is a cycle of a data clock.

11. The machine readable medium of claim 9, further comprising instructions that when executed by the processor cause the system to:
determine gain control values while performing the read operations on the rotatable storage medium.

12. The machine readable medium of claim 11, further comprising instructions that when executed by the processor cause the system to:
determine a variance when performing read operations in the test pattern.

13. The machine readable medium of claim 12, further comprising instructions that when executed by the processor cause the system to:
determine that a read/write head is unstable when the variance is larger than a predetermined amount.

14. The machine readable medium of claim 13, wherein the variance is a result of the test pattern.

15. The machine readable medium of claim 9, wherein the frequency is less than 1/(4T) wherein T is a data clock cycle.

16. The machine readable medium of claim 9, wherein the frequency is less than 1/(8T) wherein T is a data clock cycle.

17. A method for detecting a read/write head that is prone to instability, the method comprising:

determining gain control values when not reading from a rotatable storage medium;
performing read operations on the rotatable storage medium;
varying a magnetic field in a test pattern while performing the read operations, wherein the magnetic field is varied at a low frequency;
determining gain control values while performing the read operations on the rotatable storage medium;
determining a variance when performing the read operations in the test pattern on the rotatable storage medium; and
determining that a read/write head is unstable when the variance is larger than a predetermined amount.

18. The method of claim 17, wherein the low frequency is less than 1/(16T) wherein T is a cycle of a data clock.

19. The method of claim 17, wherein the frequency is less than 1/(4T) wherein T is a data clock cycle.

20. The method of claim 17, wherein the frequency is less than 1/(8T) wherein T is a data clock cycle.

21. A storage device comprising:
a rotatable storage medium; and
a read/write mechanism configured to read from and write to the rotatable storage medium, the read/write mechanism comprising a read/write head; and
a controller configured to:
determine gain control values when the read/write mechanism is not reading from the rotatable storage medium;
direct the read/write mechanism to perform read operations on the rotatable storage medium; and
vary a magnetic field in a test pattern while the read/write mechanism is performing the read operations, wherein the magnetic field is varied at a low frequency, the low frequency configured to cause excitation of a free layer of the read/write head.

22. A system for detecting unstable heads, the system comprising:
a test system configured to transmit testing instructions to hard drives;
a storage device comprising:
a rotatable storage medium;
a read/write mechanism configured to read from and write to the rotatable storage medium, the read/write mechanism comprising a read/write head; and
a controller, responsive to the testing instructions, configured to:
determine gain control values when the read/write mechanism is not reading from the rotatable storage medium;
direct the read/write mechanism to perform read operations on the rotatable storage medium; and
vary a magnetic field of a test pattern while the read/write mechanism is performing the read operations, wherein the magnetic field is varied at a low frequency, the low frequency configured to cause excitation of a free layer of a read/write head.

* * * * *